March 9, 1943.  R. M. MAGNUSON  2,313,351
PRESSURE REGULATING MEANS
Filed May 6, 1940  2 Sheets-Sheet 2

INVENTOR
ROY M. MAGNUSON
BY
ATTORNEY

Patented Mar. 9, 1943

2,313,351

UNITED STATES PATENT OFFICE 2,313,351

PRESSURE REGULATING MEANS

Roy M. Magnuson, Campbell, Calif., assignor to Food Machinery Corporation, San Jose, Calif., a corporation of Delaware Application May 6, 1940, Serial No. 333,521

20 Claims. (Cl. 105—42)

This invention relates to means for regulating the pressure in the discharge line of a pump or compressor.

For purposes of disclosure the invention is herein shown as embodied in the fluid supply system of an insecticide spray pump. In systems of this type a constantly-running pump draws the fluid from a tank and delivers it at very high pressure to the discharge line which leads to one or more valved nozzles. To obtain satisfactory spraying action from the nozzle it is necessary that the fluid pressure in the discharge line be maintained substantially constant and that full pressure be available at all times at the nozzle so that when it is opened a full-force spray will immediately issue therefrom without delay or dribbling.

One of the objects of the invention is to provide means for regulating the pressure in the discharge line of a high-pressure system.

Another object is to provide a regulating means which will prevent chattering of the by-pass valve, a difficulty commonly encountered in high-pressure regulators.

Another object is to provide a regulating means which includes a by-pass valve construction capable of handling high-pressure fluids containing abrasives, such as insecticides, and which enables the parts of such valves which tend to wear out under the abrasive action to be readily renewed in the field.

Another object is to provide a regulating means which includes a piston-type actuator for the by-pass valve and means for insuring adequate lubrication of the moving parts of the piston assembly.

Figure 1:
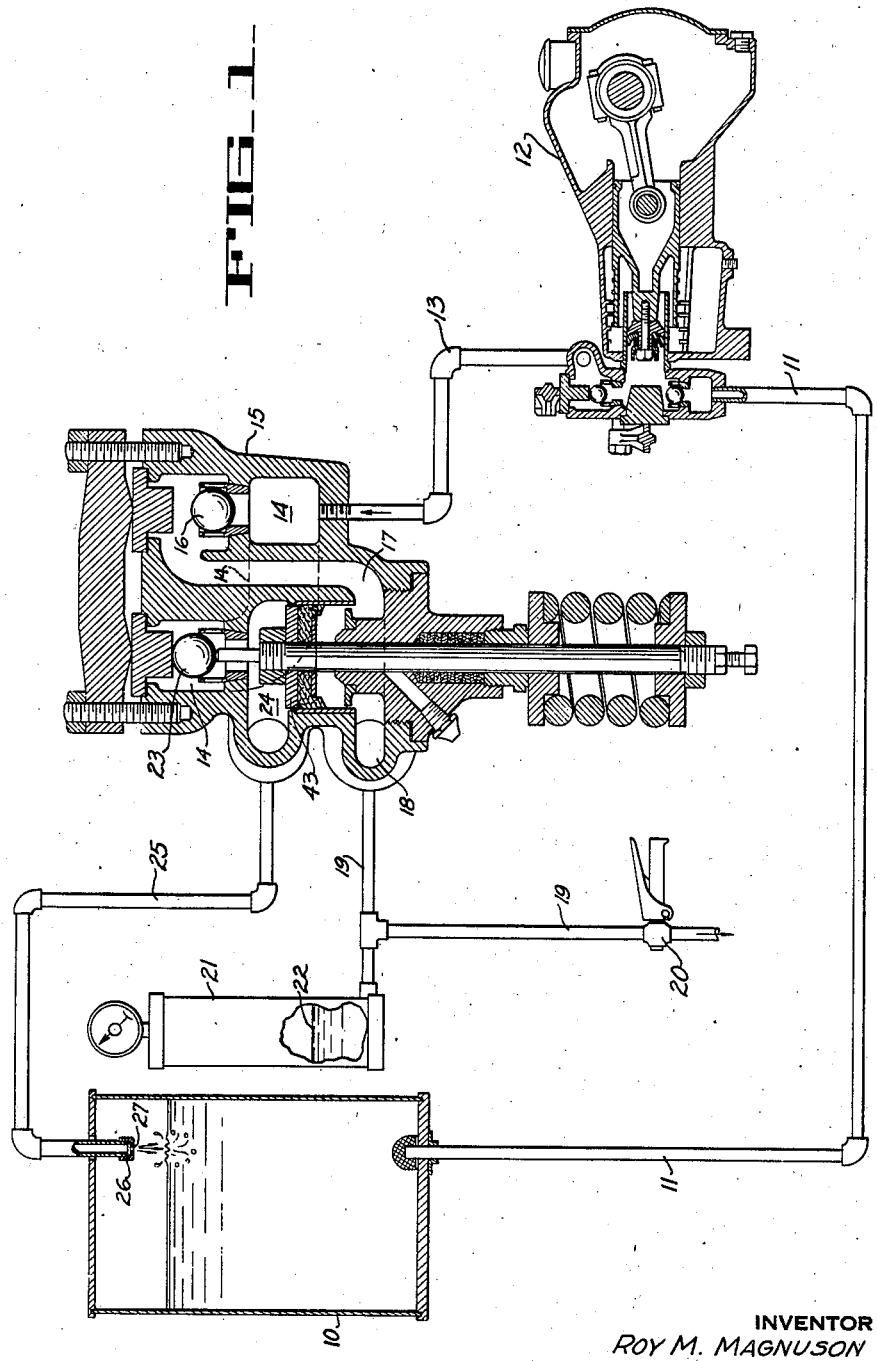
Fig. 1 is a view of the system showing diagrammatically the connections of the various elements thereof, including the regulator valve which is shown in enlarged section.

The system (Fig. 1) comprises a tank 10 containing the fluid, from which it is drawn through a suction pipe 11 by a constantly-running pump 12 which delivers the fluid at high pressure to a supply pipe 13 which is connected to the supply passage 14 of the regulator 15. A check valve 16 admits fluid to the discharge passage 17, the outlet 18 of which is connected to the discharge pipe 19 which delivers the fluid under pressure to the spray nozzles which are controlled by valves, such as the grip-valve 20. An air chamber 21 is placed in the line 19 to permit increase of fluid volume in the discharge line by compression of the entrapped air above the level 22 of the fluid in the chamber 21. A check valve 23 admits fluid from the supply passage 14 into the by-pass 24, which returns the fluid through a pipe 25 to the tank 10. For a purpose hereinafter described, means are provided for throttling the by-pass. This means is indicated diagrammatically in Fig. 1 as a cap 26 on the end of the pipe 25. The cap 26 has a restricted orifice 27 therein.

Figure 2:
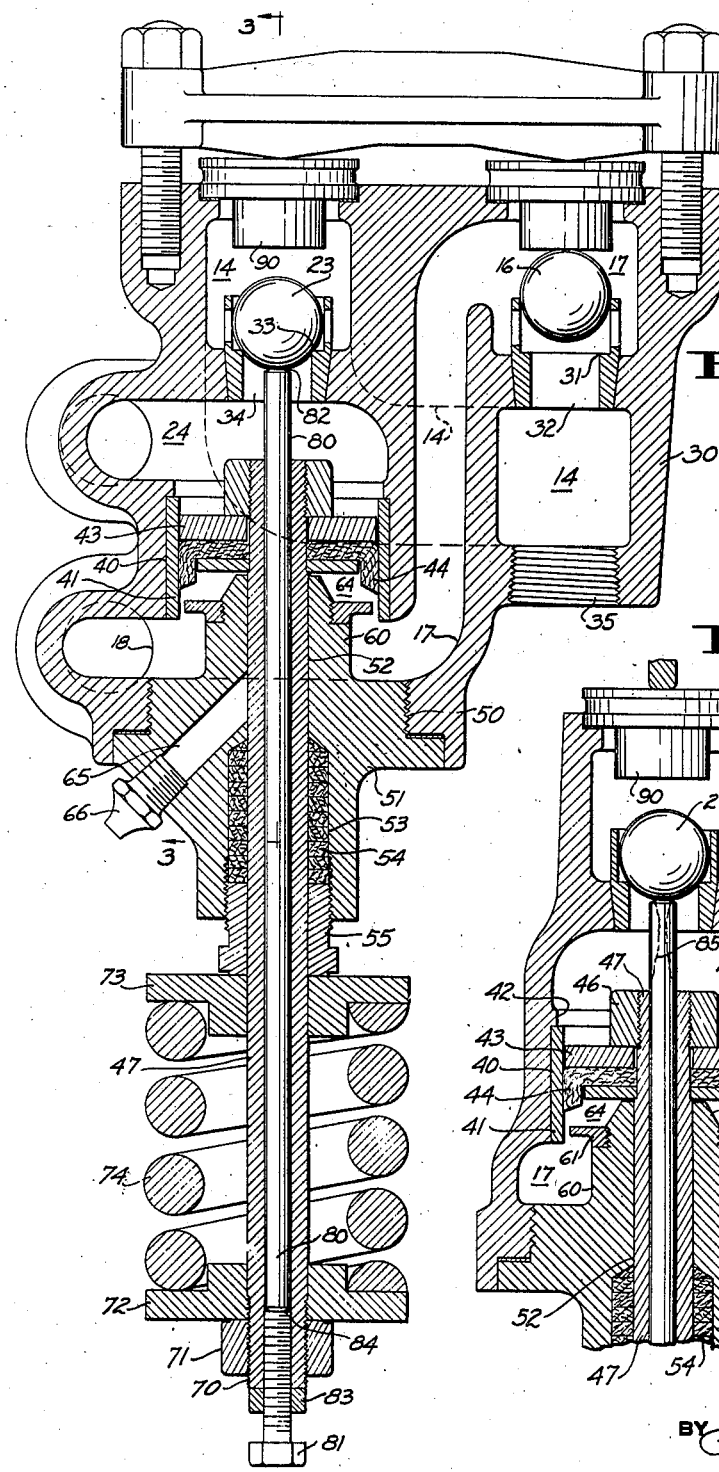
Fig. 2 is a further enlarged section of the regulator valve.
Figure 3:
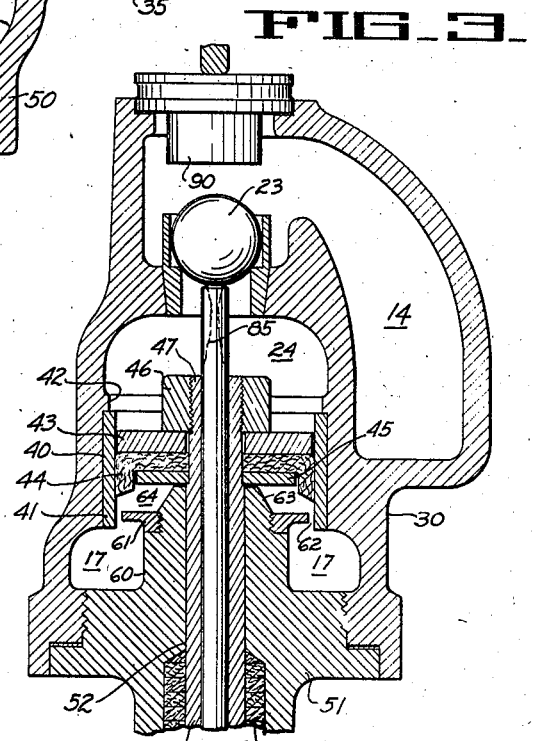
Fig. 3 is a fragmentary section taken as indicated by the arrows 3—3 in Fig. 2.

The regulator 15 is constructed as shown in detail in Figs. 2 and 3. It comprises a casing 30 in which are provided the discharge passage 17, the by-pass 24, and the supply passage 14. In Fig. 2 the ends of passage 14 appear in full and the intermediate portion is shown in broken lines. A section of this intermediate portion can be seen in Fig. 3. When the ball check valve 16 is off its seat 31 (Fig. 2) fluid may enter the discharge passage 17 from the supply passage 14 through the port 32. When the ball check valve 23 is off its seat 33 fluid may enter the by-pass 24 from the supply passage 14 through the port 34. The casing 30 has a threaded aperture 35 to receive a connection from the pipe 13 (Fig. 1). The passage 14 is consequently receiving a continuous supply of fluid from the constantly-running pump. During normal operation, as when spray valve 20 (Fig. 1) is open, the check valve 16 is open, as shown in Fig. 2, and the by-pass valve 23 is closed. However, when the pressure in discharge passage 17 rises to a predetermined amount, mechanism, presently to be described, is provided to automatically lift the ball 23 from its seat and permit fluid under pressure in passage 14 to flow through the port 34 into the by-pass 24. The resulting pressure drop in the passage 14 causes a differential pressure on the ball 16 which seats it, thus maintaining the pressure in discharge passage 17.

As shown in Fig. 3, the casing 30 has a cylindrical bore 40 which extends from the discharge passage 17 to the by-pass 24. A cylinder liner 41 is pressed into the bore against a shoulder 42. Although the cylinder 41 is open at one end to the discharge passage 17 and at the other end to the by-pass 24, fluid communication is cut off by a piston 43 adapted to reciprocate in the cylinder 41. The piston 43 is provided with a flexible pressure seal 44 which is held between the piston 43 and a washer 45 by a nut 46 threaded on the inner end of the tubular piston rod 47. Thus the piston 43 is subject to the pressure in the by-pass 24 on one side and to the pressure in the discharge passage 17 on the other side.

The casing 30 (Fig. 2) is provided with an aperture 50 which permits machining the bore 40 and assembling the cylinder 41. A member 51 is threaded into the aperture 50 and has a bore 52 in which the tubular piston rod 47 reciprocates and a counterbore 53 for packing 54, which constitutes a sealing means to prevent escape of fluid along the piston rod. A sleeve 55 threaded into counterbore 53 presses the packing 54 against tubular piston rod 47 which projects through the sleeve 55 to the exterior of the casing.

The lubrication of moving parts in any mechanism exposed to fluid at high pressure has always been a problem. The arrangement of the parts just described provides, among other advantages, an arrangement which is designed to take advantage of the fluid-pressure in distributing the lubricant to the surfaces which require it. The inner end of the member 51 is constructed in the following manner. The portion 60 disposed in the passage 17 is a cylinder of reduced diameter so as not to obstruct the flow in passage 17 (Fig. 3) which branches around the portion 60 and has communication with the end of cylinder 41 entirely around its periphery. Adjacent the end of the cylinder a ring 61 is threaded onto the member 51. The diameter of the ring 61 is less than the cylinder 41 leaving an annular space therebetween, indicated at 62, to insure that the piston 43 will be subject to the pressure in discharge passage 17. Above the ring 61 the member 51 has a tapering conical portion 63 which serves to increase the volume of the annular space 64 which constitutes the lubricant reservoir. Its confines are: the wall of the conical portion 63, the washer 45, the seal 44, the wall of the cylinder 41, and the ring 61. Lubricant in the reservoir 64 is under pressure of the fluid in discharge passage 17 admitted through annular space 62. The effect of this pressure is to tend to force the lubricant past the piston 43 and thus lubricate the seal 44 and the cylinder wall. It also tends to force lubricant into the inner end of the bore 52 and along the piston rod 47. Escape of lubricant from the bearing at its outer end is cut off by the packing gland or seal 54 (Fig. 2).

This mode of operation is desirable since these are the surfaces requiring lubrication. Not only is it important that the piston sealing washer 44 be lubricated to maintain its efficiency as a seal, but it is likewise important that the piston rod surface be kept lubricated especially at and above the point where it passes through the packing gland 54. The regulator here disclosed is particularly designed for use in a high-pressure system handling insecticides which are abrasive and corrosive. Due to the fluid pressure in the discharge passage the fluid tends to work down along the piston rod to the packing gland. If the piston rod is not thoroughly protected with lubricant the fluid will corrode the surface of the piston rod, and, when the system is standing idle, will gum up the piston rod so that it sticks. If the piston rod sticks the regulator does not operate and excessively high pressures build up in the discharge line. Therefore, the proper and efficient operation of the regulator as a whole depends to a great extent on the adequate lubrication of these two vital points.

Means are provided for filling the reservoir 64 with lubricant in the form of a passage 65 which communicates with the bore 52 and has a grease valve fitting 66 on the exterior of the casing where a grease gun can be applied to force the lubricant into the passage 65 and in along the tubular piston rod 47 to the reservoir 64.

Adjustable spring means are provided to counteract the pressure of the fluid in the discharge passage 17 on the piston 43. The tubular piston rod 47 is externally threaded at its outer end 70 to receive a spring retainer and adjusting nut 71. The spring assembly is interposed between the nut 71 and the sleeve 55. It comprises washers 72, 73, and coiled compression spring 74. When the force of the fluid pressure on the piston 43 exceeds the force of the compression spring 74 on the piston rod 47 the piston 43 moves in the cylinder 41. This movement is utilized to open the by-pass port 34. The ball 23 is removed from its seat 33 by the valve rod 80 which is retained in the tubular piston rod 47 for movement therewith by a screw 81 threaded into the outer end of the tubular piston rod 47. The screw 81 also serves to adjust the valve rod 80 with respect to the piston rod 47 to obtain the proper clearance between the end 82 of the valve rod and the ball 23. The adjustment of screw 81 can be retained by a lock nut 83 threaded on the screw.

The ends 82, 84 of the valve rod 80 are substantially identical so that the rod is reversible. The abrasives in the fluid passing through the port 34 at high velocity wear the exposed end of the rod 80 down as indicated in broken lines in Fig. 3. When the neck 85 becomes dangerously thin the screw 81 (Fig. 2) is removed, the valve rod 80 is withdrawn from the tubular piston rod 47 and reinserted with the other end 84 projecting from the inner end of the piston rod for cooperation with the ball 23. In this manner the life of the valve rod is doubled. Similarly, this construction permits ready replacement of worn-out valve rods with new ones in the field.

The operation of the regulating means is as follows: The parts as shown in Fig. 2 are in the positions they assume when the fluid in the discharge passage 17 is at the regulated or pre-determined maximum pressure. If the pressure in discharge passage 17 begins to increase, the fluid level 22 (Fig. 1) in air chamber 21 will rise, further compressing the entrapped air. The piston 43 does not move instantly because the pressure on the piston 43 is not yet great enough to unseat the ball 23 which is held on its seat by the pressure differential between the supply passage 14 and the by-pass 24.

To enable the piston to unseat the by-pass valve it is given an hydraulic advantage, in that, while the unit pressures on the ball 23 and the piston 43 are substantially equal, the effective cross-sectional area of piston 43 exceeds the cross-sectional area of the port 34. When the pressure in discharge passage 17 has increased enough to enable the piston to unseat the ball 23 the pressure differential on the ball 23 immediately reduces and much less force is required to move it further from its seat. As a result the piston tends to suddenly force the ball upward against the stop 90. My invention obviates this undesirable result by providing the restricted outlet 27 (Fig. 1) in the by-pass line. This serves to dampen the action of the piston 43 by causing pressure to build up above the piston opposing the pressure under the piston.

The pressure builds up for two reasons. First, the pressure in the by-pass does not remain at atmospheric but increases as the fluid is pumped into the by-pass from the supply passage 14. Second, the piston 43 in rising displaces fluid from its cylinder more rapidly than a corresponding amount of fluid can be discharged through the orifice 27 because the diameter of the piston is much greater than the diameter of the orifice. In other words, assuming the piston were not being urged upwardly when the by-pass is opened, the flow of fluid under pressure from passage 14 into the by-pass would itself build up pressure on the piston because of the restricted outlet of the by-pass. In addition, the movement of the piston, in reducing the volume of the by-pass, itself creates a back pressure.

This construction also eliminates chattering of the by-pass valve which commonly occurs in regulators when there is a leak in the discharge line due to rapid closing and opening of the by-pass valve to compensate for the small leakage. By arranging the parts of the regulator with a pressure-responsive device subject to the pressures in both the discharge passage and the by-pass for opening the by-pass valve I obtain a quiet, efficient action of the regulator that makes for more dependable and satisfactory operation with less wear on the parts.

When the by-pass valve 23 is opened, as shown in Fig. 1, the pressure drop in the supply passage 14 causes the check valve 16 to close, thus maintaining the pressure in the discharge line at a pressure in excess of the normal operating pressure, the additional pressure being substantially the amount necessary to be applied to the piston to effect opening of the by-pass valve. This somewhat higher than normal pressure is used to advantage in starting the spray from the nozzle when the valve 20 is opened. When the pressure in the discharge line returns to the operating pressure the fluid level 22 in the air chamber 21 falls and the regulator parts return to the positions shown in Fig. 2.

It will be noted that in the foregoing specification the passage 24 and pipe 25 were referred to as the "by-pass." In other words, the "by-pass" is a passage extending from the by-pass valve to the reservoir. In the claims this term "by-pass" is intended to have the same meaning.

The by-pass is the passage into which the fluid flows from the supply passage when the by-pass valve is opened. By connecting the by-pass to the pressure responsive device the by-pass valve actuator is subjected to dampening when the by-pass valve is opened. Moreover, the device is then subject not to the discharge pressure alone, but to the pressure differential between the by-pass and the discharge. This differential changes in ratio when the by-pass valve is open because there is a restriction at 27 in the by-pass which causes the pressure in the by-pass to build up.

The backing up of pressure on the by-pass side of the pressure responsive device increases the dampening effect on the by-pass valve actuator, reduces the pressure differential between the by-pass and discharge passage, and produces a downward movement of the piston 43. The latter movement further boosts the fluid pressure in the discharge passage 18, and this effect is visually observable at the gauge associated with the air chamber 21, whose reading will increase. The pressure would increase even without an air cushion. Moreover, it will be observed that substantial forces are now made available to assist the spring 74 in closing the by-pass valve 23 when the service valve 20 is opened and such closing may be effected at a pressure closer to the normal operating pressure; also that a desired starting pressure may be made available in the discharge passage 18 that could not otherwise be obtained, and this without increasing the normal operating load of the pump.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A pressure regulator, having a supply passage to receive fluid from a pump, a discharge passage for receiving fluid from said supply passage and for connecting with a service outlet, a by-pass, a by-pass valve controlling communication between said by-pass and said supply passage, means responsive to the fluid pressure in said discharge passage for opening said by-pass valve when flow of fluid from said service outlet is restricted to thereby divert flow of fluid from said supply passage to said by-pass, and back pressure producing means for reducing the pressure differential between the by-pass and discharge passages when said by-pass valve is open, whereby to facilitate closure of the by-pass valve when normal flow at the service outlet is resumed and to facilitate rapid resumption of normal pressure and volume at said outlet.

2. A pressure regulator having, a supply passage to receive fluid from a pump, a discharge passage for receiving fluid from said supply passage, a by-pass, a by-pass valve controlling communication between said by-pass and said supply passage, a movable pressure-responsive device having a face exposed to the fluid in said by-pass and having another face exposed to the fluid in said discharge passage and means associated with said pressure responsive device and independent of said faces for unseating said by-pass valve.

3. A pressure regulator having, a supply passage to receive fluid from a pump, a discharge passage, a check valve controlling communication between said supply and discharge passages, a by-pass, a by-pass valve controlling communication between said by-pass and said supply passage, and a piston provided with means for unseating said by-pass valve, one side of said piston being subject to pressure of the fluid in said discharge passage for actuating said unseating means in opening of said by-pass valve, and the other side of said piston being subject to pressure of the fluid in said by-pass for cushioning said unseating means during opening of said valve.

4. The combination with a pump adapted to deliver fluid under pressure to a discharge passage, of means to by-pass fluid delivered by said pump for regulating the pressure in said discharge passage, comprising a port to admit fluid from the pump into the by-pass, a valve to close said port, a movable fluid pressure-responsive device provided with means to open said valve, and a second port in the by-pass, said second port being of less cross-sectional area than said first port, said pressure responsive device having a face adjacent said valve opening means exposed to the fluid in the by-pass between said two ports and having a parallel face exposed to the fluid in said discharge passage.

5. In a pressure regulator, a passage for receiving fluid under pressure, a second passage for receiving fluid, said second passage communicating with said first passage through a port, a valve for closing said port, the pressure differential between the fluid in said two passages normally maintaining said valve closed, means to open said valve, including a piston subject to the pressure of the fluid in said second passage, and a restricted outlet in said second passage to cause the fluid in said second passage to apply a back pressure to said piston after said valve opening means has forced said valve open and broken the differential pressure thereon.

6. The combination with a pump adapted to deliver fluid continuously to a supply passage, a discharge passage, a check valve to admit fluid from said supply passage to said discharge passage, an expansion chamber in said discharge passage having air entrapped therein, a piston having a side exposed to the fluid pressure in said discharge passage, a by-pass having a valve actuated by means associated with said piston to admit fluid from said supply passage to said by-pass, said piston having another side exposed to the fluid in said by-pass, and said by-pass having a restricted outlet to build up pressure on the by-pass side of said piston after said valve actuating means has opened said by-pass valve.

7. The combination with a pump adapted to deliver fluid under pressure to a discharge passage, of means to by-pass fluid delivered by said pump for regulating the pressure in said discharge passage, comprising a by-pass valve, a piston having one of its sides exposed to the fluid in said discharge passage and provided with means actuated by the pressure of said fluid upon said side to open said valve, spring means acting on said piston to oppose said fluid pressure, said piston having its opposite side exposed to the fluid in the by-pass, and a restricted opening in the by-pass to create a back pressure against the side of the piston exposed to the fluid therein to dampen the movement of said valve actuating means.

8. In a valve, a casing, a ball valve in said casing, a valve rod adapted to unseat said ball, said valve rod having substantially-identical ends to enable it to be reversed, a tube slidable in an aperture in said casing and projecting outside said casing, said valve rod being adapted to be inserted into said tube from the external end thereof and to project from the internal end thereof to engage said ball, and a screw in the external end of said tube to retain said valve rod therein.

9. In a valve, a casing, a ball valve in said casing, a valve rod adapted to unseat said ball, said valve rod having substantially-identical ends to enable it to be reversed, a tube slidable in an aperture in said casing and projecting outside said casing, said valve rod being adapted to be inserted into said tube from the external end thereof and to project from the internal end thereof to engage said ball, and means on the external end of said tube to retain said valve rod in place therein.

10. A pressure regulator comprising a casing, having a discharge passage and a by-pass therein, a by-pass valve, means for actuating said valve, including a member extending through an aperture in said casing to the exterior thereof, sealing means to prevent escape of fluid through said aperture, and means to introduce lubricant to the surface of said member on the fluid pressure side of said sealing means.

11. A pressure regulator comprising a casing, having a discharge passage and a by-pass formed therein, a by-pass valve, means to actuate said valve, including a piston slidable in a cylinder, one end of said cylinder having an opening into said discharge passage, and means to introduce a supply of lubricant into said end of said cylinder, whereby the lubricant will be subject to the pressure of the fluid in said discharge passage and said pressure will aid in supplying the lubricant to the walls of said cylinder by tending to force the lubricant past the piston.

12. A pressure regulator comprising a casing, having a discharge passage and a by-pass therein, a by-pass valve, means for actuating said valve comprising, a cylinder in said casing, a piston slidable therein, said piston having a piston rod extending through an aperture in said casing to the exterior thereof, sealing means to prevent escape of fluid through said aperture, means to form a reservoir for lubricant intermediate said piston and said sealing means, the lubricant having access to said cylinder and said piston rod from said reservoir, said reservoir having an opening into said discharge passage, whereby the fluid pressure in said discharge passage forces the lubricant from said reservoir toward said piston and toward said sealing means.

13. A pressure regulator comprising a casing, having a discharge passage and a by-pass therein, a by-pass valve, means responsive to the pressure of the fluid in said discharge passage for actuating said by-pass valve, including a piston slidable in a cylinder in said casing, said piston having a sealing means to prevent escape of fluid thereby, said piston having a piston rod extending through an aperture in said casing, sealing means to prevent escape of fluid through said aperture, means to provide a reservoir of lubricant on the piston rod side of said piston, said reservoir having an opening into said discharge passage, whereby the pressure of the fluid in said discharge passage will force the lubricant in two opposite directions from said reservoir, along the piston rod to said piston rod sealing means, and over the cylinder walls to said piston sealing means.

14. A pressure regulator comprising a casing, having a discharge passage and a by-pass formed therein, a by-pass valve, means for actuating said valve, including a piston slidable in a cylinder, said piston having a piston rod extending through an aperture in said casing to the exterior thereof, sealing means to prevent escape of fluid through said aperture, the piston rod end of said cylinder being formed to provide a reservoir for lubricant, the lubricant having two paths of egress from said reservoir, one along said piston rod toward said sealing means, the other along said cylinder toward said piston, said end of said cylinder having communication with said discharge passage to subject the lubricant to the pressure of the fluid and thereby utilize the fluid pressure to force the lubricant into said two paths of egress from said reservoir.

15. A pressure regulator, having a supply passage to receive fluid from a pump, a discharge passage for receiving fluid from said supply passage, a by-pass, a by-pass valve controlling communication between said by-pass and said supply passage, and a movable pressure responsive device provided with means for unseating said by-pass valve, said pressure responsive device also having opposite faces, one of which is exposed to fluid in said by-pass and the other of which is exposed to the fluid in said discharge passage.

16. A pressure regulator, having a supply passage for receiving fluid from a pump, a discharge passage for receiving fluid from said supply passage, a by-pass, a by-pass valve controlling communication between said by-pass and said supply passage, a movable pressure responsive device having a face exposed to the pressure of the fluid in said by-pass and having another face exposed to the pressure of the fluid in said discharge passage, means associated with said pressure responsive device for opening said by-pass valve, and back pressure means for producing a counter pressure against the by-pass face of said pressure responsive device.

17. A pressure regulator, having a supply passage for receiving fluid from a pump, a discharge passage for receiving fluid from said supply passage and for connecting with a service outlet, a check valve controlling communication between said supply and discharge passages, a by-pass, a by-pass valve controlling communication between said by-pass and said supply passage, a pressure responsive means movable in said by-pass and in said discharge passage, and provided with means for unseating said by-pass valve when said service outlet is closed, and with resilient means tending to maintain said valve closed, said pressure responsive means having a face exposed to the fluid in said by-pass and another face exposed to the fluid in said discharge passage, and back pressure means associated with said by-pass and pressure responsive means for boosting the fluid pressure in said by-pass and in said discharge passage to facilitate rapid resumption of normal pressure and volume at the service outlet when said outlet is reopened.

18. A pressure regulator having a supply passage for receiving fluid from a pump, a discharge passage, for receiving fluid from said supply passage, a valve controlling communication between said supply and discharge passages, a by-pass, a by-pass valve controlling communication between said by-pass and said supply passage, a pressure responsive device movable between said by-pass and said discharge passage, said pressure responsive device having opposite faces one of which is exposed to the fluid in said by-pass and the other of which is exposed to the fluid in said discharge passage, and having means for opening said by-pass valve, and pressure boosting means for creating a back pressure against said by-pass face of said pressure responsive device when said by-pass valve is open, and for moving said device in a direction to increase the pressure in said discharge passage.

19. In a fluid pumping system including a pump for supplying fluid under pressure, a service outlet to which the fluid is directed by said pump, a pump discharge line intermediate the service outlet and pump, a check valve between the discharge line and pump, a by-pass for diverting fluid from said discharge line, and means for opening said by-pass when said service outlet is closed and for closing said by-pass when said outlet is reopened; the improvement which consists in pressure boosting means for building up the fluid pressure in said discharge line while said by-pass is open, and said service outlet is closed whereby a desired fluid pressure greater than pump pressure may be made available at said outlet and without increasing the normal operating load upon said pump.

20. In a fluid pumping system including a pump for supplying fluid under pressure, a service outlet to which the fluid is directed by said pump, a pump discharge line intermediate the service outlet and pump, a by-pass for diverting fluid from said discharge line, and means for opening said by-pass when normal fluid demand at said service outlet is curtailed, and for closing said by-pass when normal demand at said service outlet is resumed; the improvement which consists in movable fluid responsive means between said by-pass and discharge line and associated pressure boosting means in said by-pass for building up the fluid pressure in said by-pass when said by-pass is open whereby to facilitate closure of said by-pass and provision of adequate fluid delivery at said outlet without substantial loss of pressure, when normal demand at said service outlet is resumed.

ROY M. MAGNUSON.